United States Patent
Hatanaka et al.

[19]

[11] Patent Number: 6,154,006
[45] Date of Patent: Nov. 28, 2000

[54] BATTERY RENTAL SYSTEM

[75] Inventors: Kaoru Hatanaka; Satoshi Honda; Tetsuo Yamagata; Chiaki Kumagai, all of Saitama, Japan

[73] Assignee: Honda Giken Kogyo Kabushiki Kaisha, Tokyo, Japan

[21] Appl. No.: 09/061,910

[22] Filed: Apr. 17, 1998

[30] Foreign Application Priority Data

Apr. 18, 1997 [JP] Japan ................................ 9-102093

[51] Int. Cl.$^7$ .................................................. H02J 7/00
[52] U.S. Cl. ........................................ 320/109; 320/107
[58] Field of Search ............................. 320/109, 107, 320/124, 106

[56] References Cited

U.S. PATENT DOCUMENTS

| | | | |
|---|---|---|---|
| 5,162,989 | 11/1992 | Matsuda | 364/479.07 |
| 5,594,318 | 1/1997 | Nor et al. | 320/109 |
| 5,694,019 | 12/1997 | Uchida et al. | 320/106 |
| 5,812,641 | 9/1998 | Kanoh et al. | 379/91.02 |
| 5,917,407 | 1/1999 | Squire et al. | 340/432 |

FOREIGN PATENT DOCUMENTS 2 645106  5/1997  Japan .

OTHER PUBLICATIONS

Abstract for Japanese Patent Laid–Open No. Hei–2–93796 (Apr. 04, 1990).

*Primary Examiner*—Peter S. Wong
*Assistant Examiner*—Lawrence Luk
*Attorney, Agent, or Firm*—Birch, Stewart, Kolasch & Birch, LLP

[57] ABSTRACT

To provide a battery rental system that is extremely convenient and economical, and that is always stable. The battery rental system includes unmanned automatic battery rental stations, a communication system, a central processing station, electrically assisted bicycle batteries, and ID cards. A user merely inserts the ID card into the battery rental system and the central processing station automatically charges the user for removing a battery from the battery rental system.

12 Claims, 5 Drawing Sheets

BATTERY RENTAL SYSTEM

BACKGROUND OF THE INVENTION

1. Field of the Invention

The present invention relates to a battery rental system that makes it possible to centralize battery specific processing and user specific rental levy processing by putting information about a battery mounted on an electrically assisted vehicle and information about usage frequency, etc. of a user on a data base. The battery rental system can be used anywhere and at any time by networking the system.

2. Description of Related Art

Conventionally, bicycles are a cheap and convenient means of transportation. However, movement is achieved using only the energy of human pedal power. Also, bicycles are used to promote modem health.

A system for assisting a rider of a bicycle is now in demand wherein an electric motor is used for situations where more pedal power is required. These situations occur when actual pedal power is low due to the elderly age of the rider or a hilly road. Electrically assisted bicycles are now widely used that have a nickel cadmium battery that can be repeatedly charged as the power supply for the electric motor.

Conventionally, in situations where electrically assisted bicycles are used, the user actually purchases a battery charger. It is troublesome to take the battery used for driving the electric motor back to the user's own home for recharging.

Also, inconveniences occur such as the disconnection of the battery while the electrically assisted bicycle is in use. In addition, the distance that can be traveled with one charging of the battery is fixed so that the operating range of the electrically assisted bicycle is restricted. There has thus been a demand for the installation of battery rental stations so that users can easily take a loan of a battery for every area in which they wish to use the bicycle.

The present invention has been conceived to solve these problems, and the object of the invention is to provide an extremely convenient battery rental system which makes it possible to use a fully charged battery at any time in any place, without the need for an individual charger. The battery rental system is enables the use of a fully charged battery without the need for a cash disbursement at the time of use and without the need to determining the charged state of a battery.

A battery rental system for solving the problems discussed above includes an unmanned automatic battery rental station and a central processing unit for carrying out central processing of the unmanned automatic battery rental station via a communication line.

Because the battery rental system includes an unmanned automatic battery rental station and a central processing unit for carrying out central processing of the unmanned automatic battery rental station via a communication line, a provider can carry out battery specific processing and user specific processing centrally, and a user can obtain a fully charged battery at any place, without the need for a charger or a spare battery.

Further, the battery rental system includes control means, made up of user information means, battery specific information recognizing means and information recognizing means, and communication means, and changes a user's used battery for a fully charged battery. Thus, a user can obtain a fully charged battery as required at any time.

Since the battery rental system includes control means, made up of user information means, battery specific information recognizing means and information recognizing means, and communication means, and changes a user's used battery for a fully charged battery, a user can obtain a fully charged battery as required at any time.

Further, an ID card stores ID numbers of a user and a registered electrically assisted bicycle ID, the time and date of battery rental and a log of electricity rental, and is used in the battery rental system.

Because the ID card stores ID numbers of a user and a registered electrically assisted bicycle ID, the time and date of battery rental and a log of electricity rental, with the ID card a user can obtain a fully charged battery at any time as required without the need for a cash disbursement.

Bi-directional transmission of information between the unmanned automatic battery rental device and the central processor unit is carried out via the communication line.

Since bidirectional transmission of information between the unmanned automatic battery rental device and the central processor unit is carried out via the communication line, a provider can carry out battery specific processing and user specific processing centrally.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
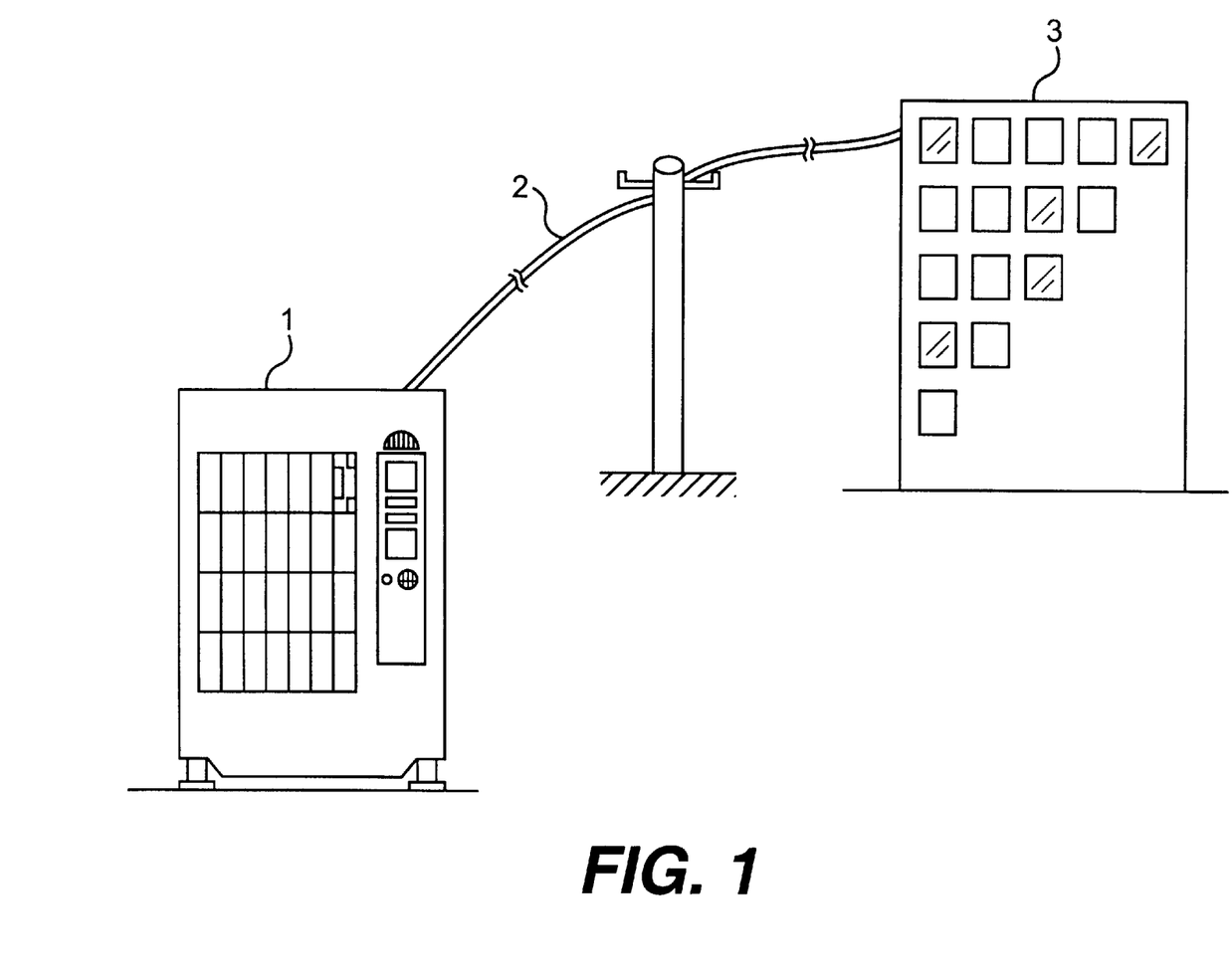
FIG. 1 is an overall schematic diagram of a battery rental system of the present invention.

The battery rental system for an electrically assisted bicycle of the present invention provides a high utility battery rental system in which a used battery mounted on the electrically assisted bicycle can be exchanged for a fully charged battery, at any time and any place. The battery rental system is convenient for a user to use. FIG. 1 is a schematic diagram of the battery rental system of the present invention.

The battery rental system is constructed as a network of unmanned automatic battery rental stations 1 and a central processing station for carrying out central processing of the automatic battery rental stations 1 via communication lines 2.

The battery rental has been planned so as to be convenient for a user by distributing a number of unmanned automatic battery rental stations 1 over a wide area based on such factors as the number of electrically assisted bicycles owned, area conditions, and the distances traveled on the electrically assisted bicycles, etc. When a user utilizes this system, a battery rental system use contract is made, for example, between a battery rental system company directly or through an agency.

The user is issued with one user registration card (ID card) for an individual, family or company, etc., which applies to one electrically assisted bicycle, from the battery rental system company, and with this one card, individual, family or company users can take advantage of the battery rental service by using the unmanned automatic battery rental stations 1.

When a user utilizes the unmanned automatic battery rental stations 1, the ID card is inserted into an ID card slot of the unmanned automatic battery rental station 1 and the recognition of user information is carried out in the unmanned automatic battery rental station 1.

If the unmanned automatic battery rental station 1 carries out information recognition for the user from the data stored in the ID card, the procedure for use and a location of a storage section for a used electrically assisted bicycle battery that is to be replaced are conveyed to the user.

Next, if the unmanned automatic battery rental station 1 confirms the necessity for replacement of a used electrically assisted bicycle battery, the location of a fully charged electrically assisted bicycle battery is notified to the user.

Following this, the unmanned automatic battery rental station 1 then writes specific information recognition information that is appended to the electrically assisted bicycle battery that has been fully charged as part of the rental service, and the used electrically assisted bicycle battery that has been returned, and the electricity use charge is stored in the ID card, and after the user has been notified of the charge the ID card is returned to the user.

The unmanned automatic battery rental station 1 also carries out bi-directional transmission of data, such as the time and date when the electrically assisted bicycle battery that has been returned, electrical use charge and serial number, a log and specific information for the number of times a battery has been charged, and the time and date of the new rental etc., to the central processing station 3 via a communication line 2 such as a telephone line or a dedicated line, using a communication device such as a modem.

The central processing station 3 is connected to a plurality of unmanned automatic battery rental stations 1 of each area by the communication lines 2 and carries out central processing using a computer. The user rental information from the unmanned automatic battery rental stations 1 and the information recognition information specific to an electrically assisted bicycle battery are processed, and for the electrically assisted bicycle battery, data is transmitted to a battery maintenance section, rental for every fixed period is notified to a user and the rental levy is sent to a bank etc.

Figure 2:
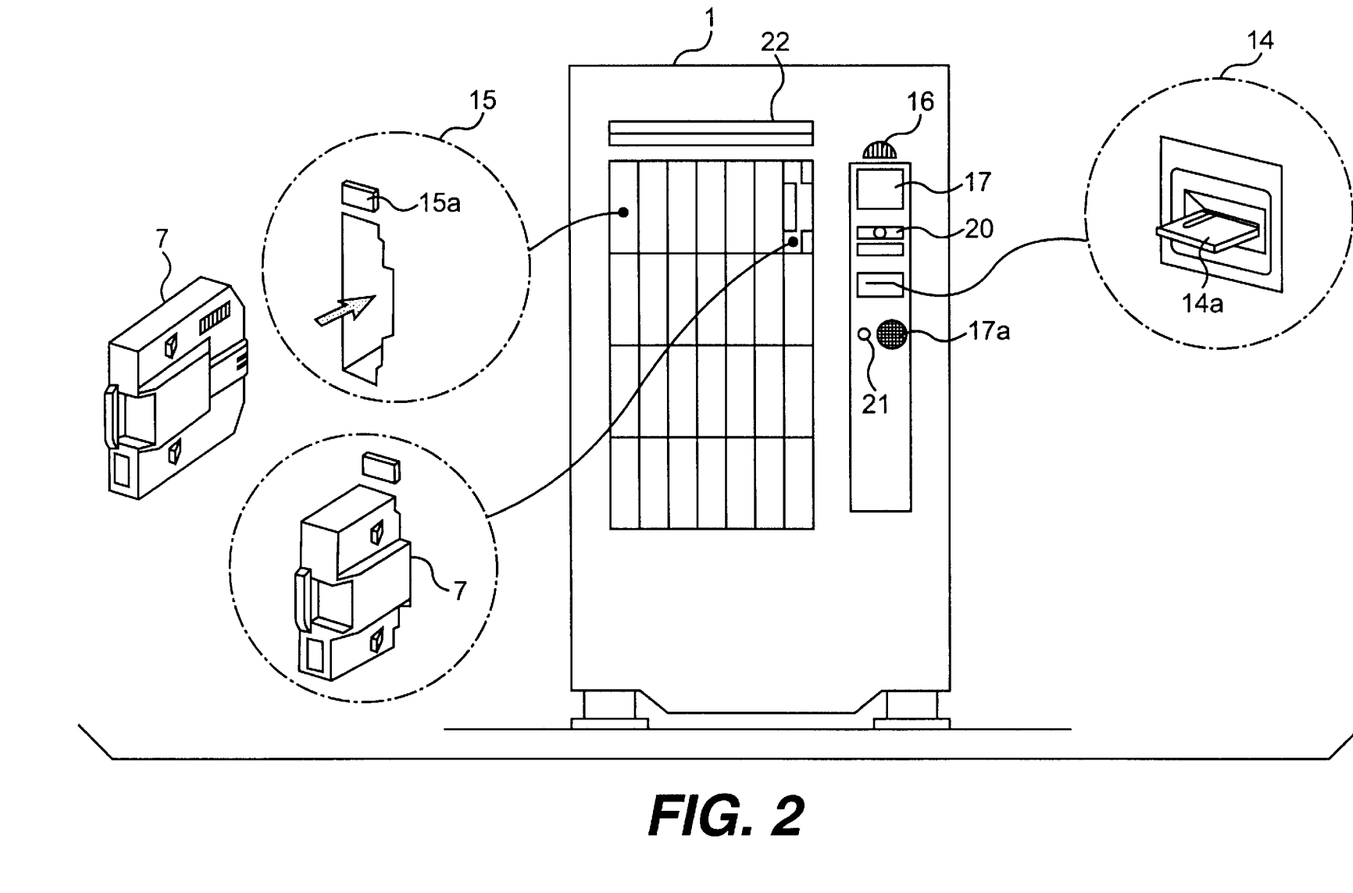
FIG. 2 is a schematic diagram of an unmanned automatic battery rental station of the present invention.

FIG. 2 is a schematic diagram of an unmanned automatic battery rental station of the present invention.

The unmanned automatic battery rental station includes an electrically assisted bicycle battery, a card slot, an ID card, a storage section, a storage section indicating lamp, an alarm, a display and an audible indicator.

The unmanned automatic battery rental station 1 has a card slot 14, and if a user inserts an ID card 14a into the card slot 14 a check of the card body is carried out and it is checked whether or not a registered ID card number and the ID card 14a match.

If the registered ID number and the ID card 14a match, the user and the registered ID number of the electrically assisted bicycle are recognized, and checks are carried out on the user rental and a log of the electrical usage charge, levy, etc. As long as there are no abnormalities with the ID card 14a, the procedure for use is conveyed to the user by the display 17 and the audible indicator 17a.

In the event that there are abnormalities with the ID card 14, the reason why the card can not be used is illustrated by the display 17 and an audible indicator 17a. If the electrically assisted bicycle battery rental service can not be used, and the ID card is returned from the ID card slot 14a.

The unmanned automatic battery rental station 1 notifies a place for returning used electrically assisted bicycle batteries from within a storage section 15 for electrically assisted bicycle batteries located on the front of the unmanned automatic battery rental station 1 using the display 17 and audible indicator 17a, and also flashes an indicator lamp 15a at an upper part of the storage section 15.

The unmanned automatic battery rental station 1 inserts a lock pin attached to the electrically assisted bicycle battery into the storage section 15 for used electrically assisted bicycle batteries that are to be returned, up to a locked position, and confirms that the lock pin has been locked.

The unmanned automatic battery rental station 1 notifies the storage location of a fully charged electrically assisted bicycle battery for rental 7 that can be rented from among banks of electrically assisted bicycle batteries for rental 7, using the display 17 and audible indicator 17a, and also releases a lock pin attached to the electrically assisted bicycle battery to be rented out. The user simply pulls out the electrically assisted bicycle battery for rental 7.

Further, the serial number and electrical usage charge of the used electrically assisted bicycle battery for rental 7 that has been returned, and the time and date of the newly rented battery are notified to the user by the display 17 and the audible indicator 17a, the electricity bill is stored in the ID card 14a, and the user's ID card 14a is ejected from the ID card slot 14 and returned to the user.

The time and date of the used electrically assisted bicycle battery for rental 7 that has been returned, the electricity bill, the number of times it has been rented and the time and date of the newly rented battery, provide specific electrical data information for charging, and this data is transmitted to the central processing station 3 via the communication line 2.

Information of the electrical processing method corresponding to the data information is received from the central processing station 3. Electrical processing is carried out in accordance with informational instructions of the received information, and data information resulting from the processing is resent to the central processing station 3 via the communication line 2.

An alarm 16 is also provided, and an alarm sound is generated in the event of some problem or other situation. When there is an emergency, the place where the central processing station is based or the service center having the rental agreement can be contacted by operating the intercom call switch 21. A person detecting sensor 20 is also provided to give a greeting etc., and operates when a person comes to the rental station. The light 22 is also provided.

Figure 3:
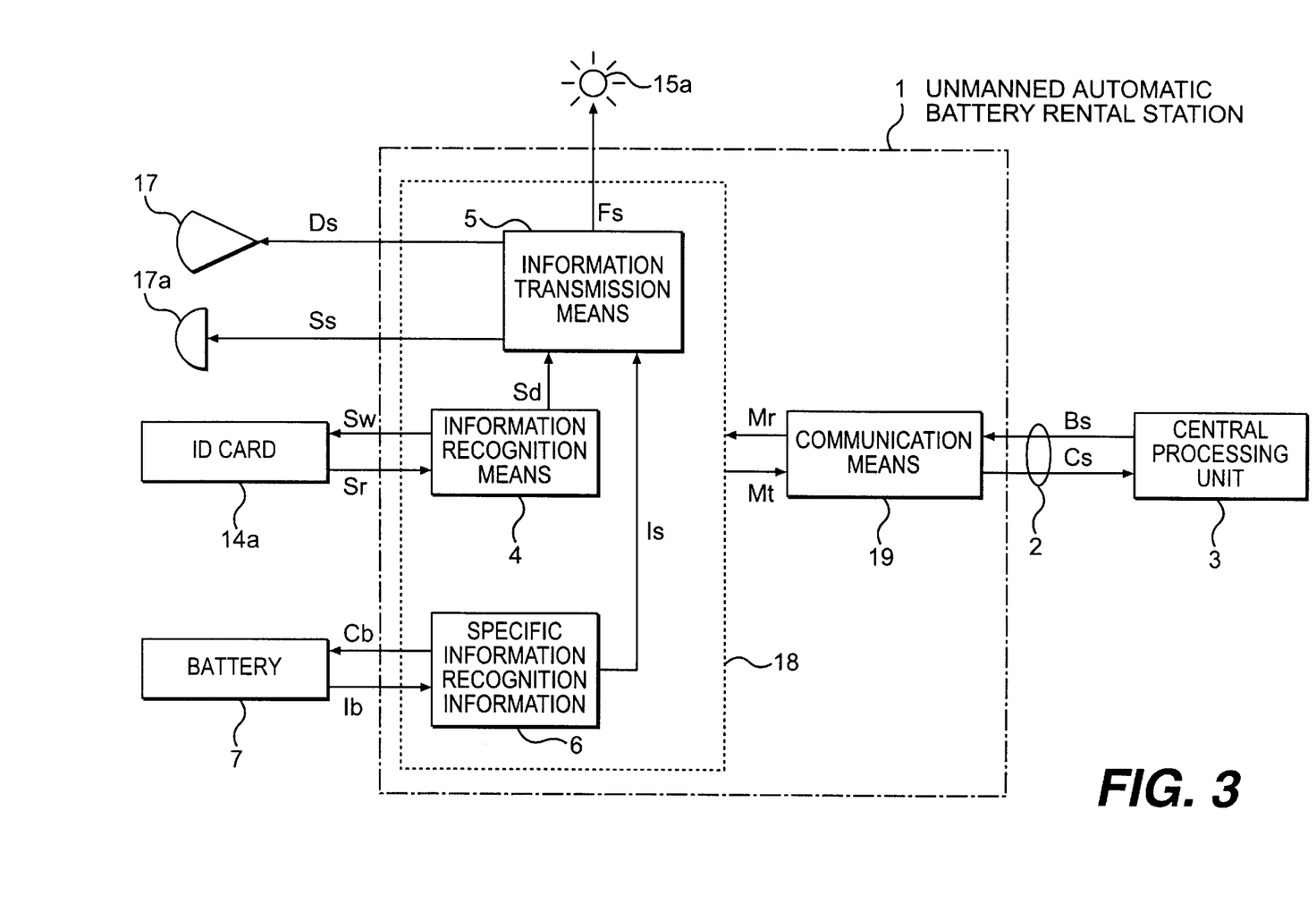
FIG. 3 is a block diagram of essential parts of an unmanned automatic battery rental station of the present invention.

FIG. 3 is a block schematic diagram of essential parts of the unmanned automatic battery rental station according to this invention.

The unmanned automatic battery rental station 1 comprises control means 18, provided with information recognition means 4, information transmission means 5 and specific information recognition means 6, and communication means 19.

The information recognition means 4 is formed to perform read/write operations, etc. and comprises circuits for saturation characteristics, overwrite, resolution, and playback output etc., an ID card drive mechanism and a magnetic head.

The ID card 14a is made of a plastic sheet etc. having the shape of a playing card or the like, and a magnetic body, such as ferrite, is coated in a cylindrical or stripe shape on one surface of the card to give the card a memory function.

The information recognition means 4 checks the body of the ID card 14a using a card reader, and checks whether the registered ID number and the ID card 14a match or not.

If the registered ID number and the ID card 14a match, then using a card reader, the information recognition means 4 reads out read signals Sr, such as a code number of the user, time and date of the most recent rental, and renewal date that have been written into the ID card 14a by a card writer. If no abnormalities exist with regard to the ID card 14a, recognition signals Sd are provided to the information transmission means 5.

Further, the date of the most recent rental is written into the ID card 14a by a card writer, using a write signal Sw, and this information and data is provided to information transmission means 5 as recognition signals Sd The information transmission means 5 includes a display device 17 such as an LCD, CRT, LED, EL etc., an audible indicator 17a such as a speaker, and a storage position indicating lamp 15a such as an LED or a lamp above the storage section 15. A display signal Ds from the information transmission means 5 is supplied to the display 17, and an audio signal Ss is provided to the audible indictor 17a.

A flashing signal Fs is provided to the storage position indicating lamp 15a etc.

The specific information recognition means 6 comprises a bar code reader, having a laser or infrared light transmitter, a scanner for scanning light, a photo transistor for detecting light signals and a waveform shaping circuit, etc., and a terminal connector. A battery identification bar code is read using the bar code reader and measurements of the electrical characteristics of the electrically assisted bicycle battery 7 are measured and charging is carried out from the terminal connector.

The specific information recognition means 6 measures a residual amount of electricity, etc. from the terminal connector corresponding to terminals 9, 10 and 11 of the electrically assisted bicycle battery 7 (refer to FIG. 4), to acquire battery signals 1b, and according to the battery signals 1b, required processing for charging generates charge signals Cb from the terminal connectors corresponding to the terminals 9 and 11 of the electrically assisted bicycle battery 7.

The specific information recognition means 6 is provided with battery specific data information, such as battery temperature, and data information such as the temperature of the open air, as battery signals 1b.

The specific information recognition means 6 also supplies the information that has been read out by the bar code reader to the information transmission means 5 as information signals Is.

The communication means 19 comprises a modulation circuit, a clock circuit, a transmission circuit and a photo coupler, etc. For example, a bi-directional transmitter such as a modem modulates information signals Mt made up of read signals Sr from the information recognition means 4 and battery signals 1b from the specific information recognition means 6, and supplies transmission signals Cs as pulse signals, for example, to the central processing station 3 via the transmission line 2.

Receive signals Bs, which are pulse signals, for example, are supplied from the central processing station 3 via the transmission line 2 and demodulated to give process signals Mr which are in turn supplied from the specific information recognition means 6 as charge signals CB and from the information recognition means 4 as write signals Sw.

The central processing station 3 receives data at the unmanned automatic battery rental station 1 as transmission signals CS from the communication means 19 via the transmission line 2, and supplies necessary data for the unmanned automatic battery rental station 1 to the unmanned automatic battery rental station 1 as receive data Bs, also via the transmission line 2.

The central processing station 3 also carries out central processing using a computer. The central processing station carries out procedures for the user, the rental battery, the unmanned automatic battery rental station, and commands and measurements for battery charging, battery life span, levy of electrical usage charge etc.

User database processing is also carried out for the user's ID number, address, age, telephone number, gender, number of times leased, electrical usage charge etc.

Battery database processing includes battery sales, number of times used, number of times charged, time and date of charge, and charge amount, and life span of the battery and whether exchange is necessary.

As well as user database and battery database processing, there is data processing such as user facts and future industrial expansion obtained from rotation rate and actual work of each unmanned automatic battery rental station, the range and pattern of user movements, etc.

FIG. 4 is a diagram for storing an electrically assisted bicycle battery of the present invention in the storage section.

The electrically assisted bicycle battery 7 is provided with a positive power supply terminal 9, an electrical measurement terminal 10 and a negative power supply terminal 11.

The battery also has long pins 12 for mechanical locking, and a handle 13 for grasping the battery when the battery is removed from the battery storage section 15 of the unmanned automatic battery rental station 1.

The bar code 8 is a code specific to the electrically assisted bicycle battery and is stored to enable recognition of manufacturing number, and manufacturing date.

A code specific to the electrically assisted bicycle battery 7 is read by a scanner of the unmanned automatic battery rental station 1.

The residual amount of the battery is measured from the positive power supply terminal 9 and the negative power supply terminal 11, and charging is carried out.

A voltage to be applied to the positive power supply terminal 9, negative power supply terminal 11 and the measurement terminal 10, at the time of charging is measured. In addition, a current that will flow at the time of charging, a discharge current and a charge current, average current for one minute, energy capacity at full charge, time that will be taken for the residual amount of the battery to become zero at the current discharge current, time that will be taken for the residual amount of the battery to become zero at the average discharge current, time that will be taken for the battery to become fully charged at the average charging current, energy capacity at the time of rental, voltage at the time of rental etc. are also measured.

The electrically assisted bicycle battery 7 is provided with lock pins 12, and if the battery is inserted into the returned storage section 15 of the unmanned automatic battery rental station 1, the long pins 12 are mechanically brought out and locked.

In response to a release signal of the unmanned automatic battery rental station 1, the long pins 12 of a fully charged electrically assisted bicycle battery 7 are pushed back as far as the return fixtures inside the storage section 15, and a fully charged electrically assisted bicycle battery 7 can be simply pulled out of the storage section 15 using the handle 13.

Figures 4A, 4B, 4D:
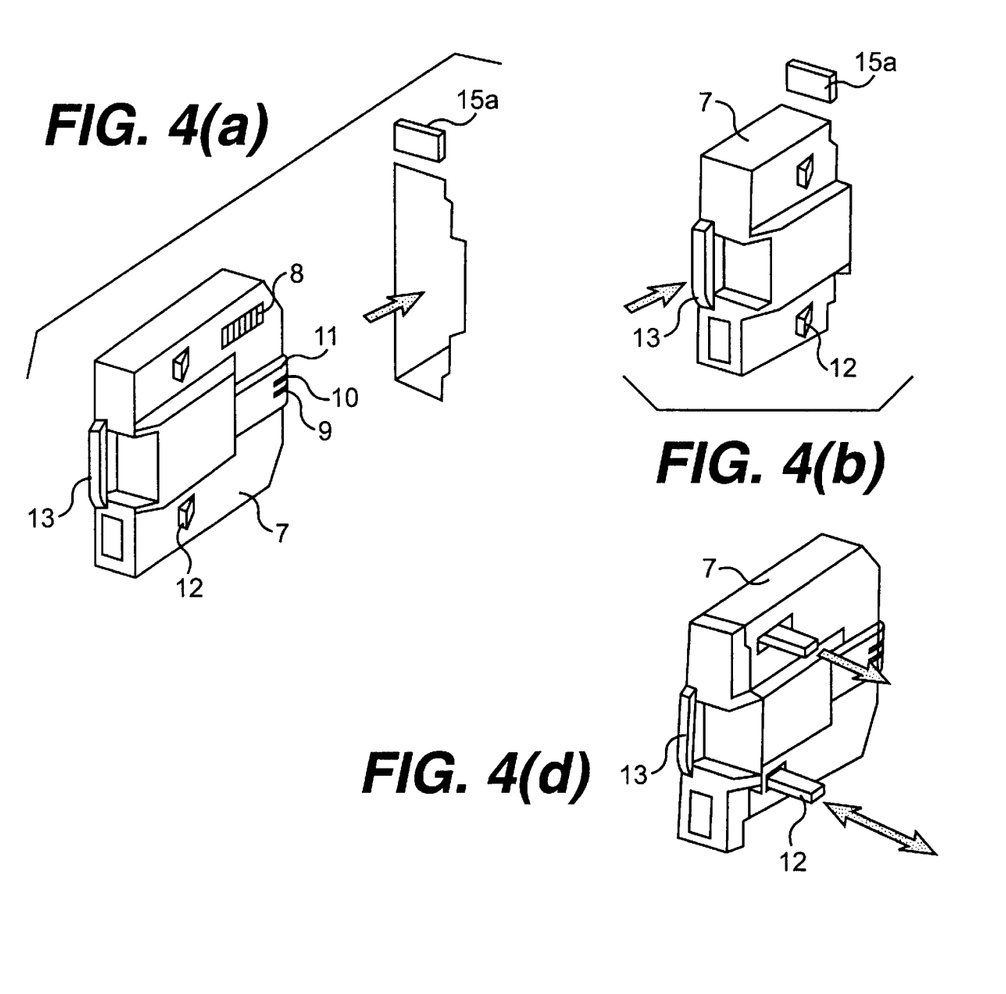
FIGS. 4(a) to 4(d) are views illustrating a diagram for storing an electrically assisted bicycle battery of the present invention in a storage section.

FIG. 4(*a*) is a view illustrating the inserting of a returned used electrically assisted bicycle battery 7 into a place above the storage section 15 where the LED 15*a* is flashing.

FIG. 4(*b*) is a view where lock pins are in the middle of being inserted and do not protrude as shown in FIG. 4(*d*).

Figure 4C:
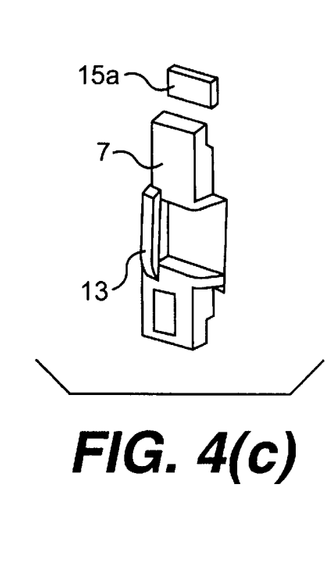

FIG. 4(*c*) is a view where the returned electrically assisted bicycle battery 7 is completely pushed in and the lock pins 12 protrude to lock the battery in place.

In this way, if the battery rental system recognizes a user using the card reader and ID card of the information recognizing means of the unmanned automatic battery rental station, usage procedure and the battery storage section are notified to the user by the audio and the display of the information transmission means, and flashing the LED above the returned battery storage section.

If the returned used electrically assisted bicycle battery is inserted and the battery rental system confirms that it has been locked by the long pins, a bar code of the returned battery is read using a scanner and a specific code is recognized by the specific information recognizing means, the residual amount of electricity is measured from the battery terminals and terminal connector, and the user is notified of the residual amount of electricity and the electricity usage bill through both an audio response and the display.

The battery rental system also notifies the user of the location of a fully charged electrically assisted bicycle battery, again using an audio response and the display, and by flashing the LED above the storage section. Thereafter the lock pins of the fully charged electrically assisted bicycle battery are released.

A battery ID of the fully charged battery being rented, the time and date of rental and the electricity usage bill for the returned battery are stored in the card to be returned, using a card writer, the ID card is ejected from the ID card slot and a message such as that the operation is completed, etc. is outputted to the user, again using an audio response and the display.

The battery rental system again measures various electrical conditions from the battery terminals of the returned used battery, the measured data is transmitted to the central processing station via the communication line, and various electrical conditions corresponding to the measurement results are received again from the central processing station.

Using a computer, the central processing station carries out central processing for a plurality of unmanned automatic battery rental stations connected in a network via a communication line such as a phone line or an exclusive line.

The central processing station carries out procedures for the user, the rental battery, the unmanned automatic battery rental station, commands and measurements for battery charging, battery life span, the levy of electrical usage charge etc.

Particularly, the battery rental can obtain address, age, telephone number, gender, number of times leased, electrical usage charge etc. as user ID data, sales, number of times used, number of times charged, time and date of charge, and charge amount, and life span of the battery. The battery rental can determine whether the exchange is necessary based on battery data, and rotation rate and actual work of each unmanned automatic battery rental station, the range and pattern of user movements, etc. as user facts and future industrial expansion data.

Next, the operation of the unmanned automatic battery rental station of FIG. 2 will be described based on a flow chart.

Figure 5:
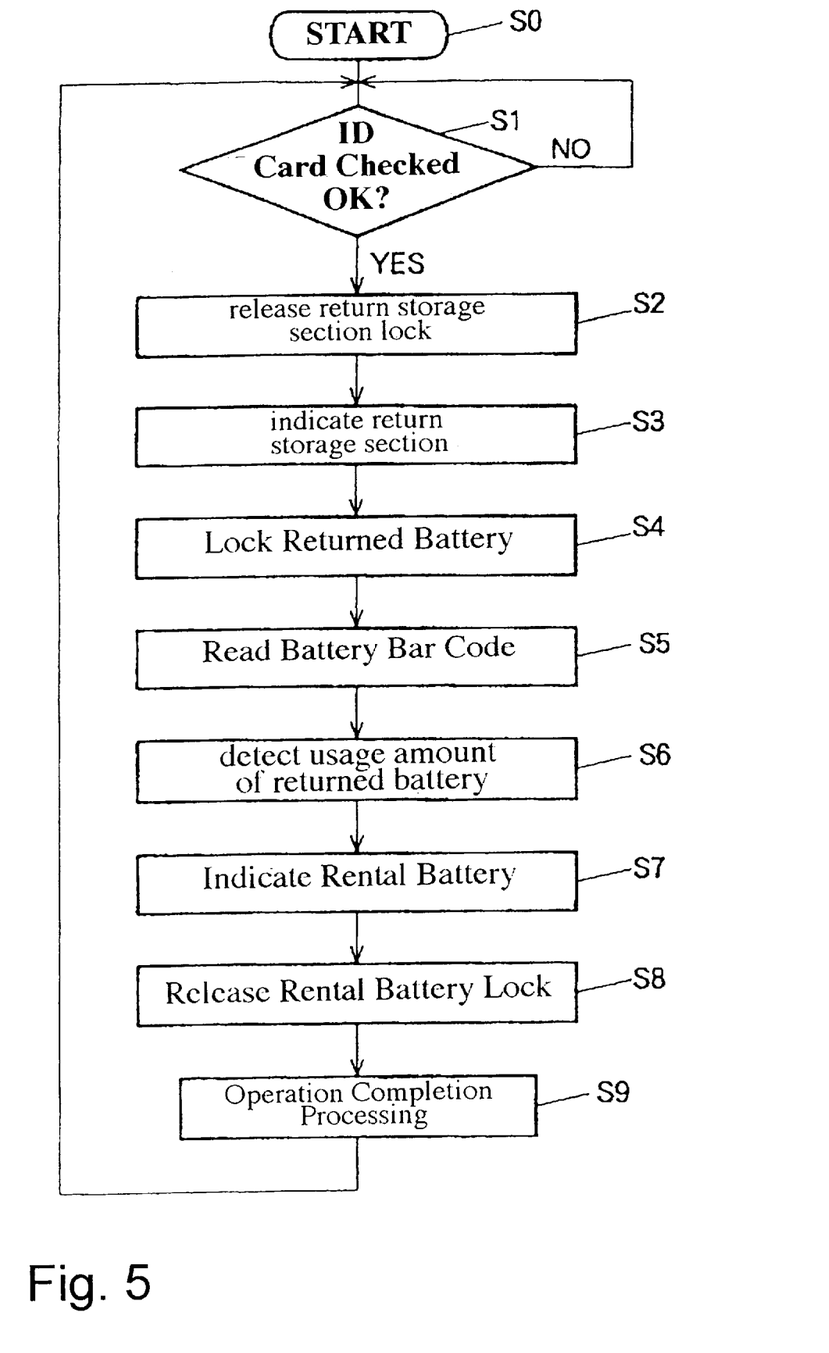
FIG. 5 is a flow chart of the operation of an unmanned automatic battery rental station.

FIG. 5 is a flow chart of the operation of one embodiment of the unmanned automatic battery rental station of FIG. 2. The flow chart sets forth steps S0–S9 show each operating state of the unmanned automatic battery rental station.

State S0 is the situation whenever the battery rental is carried out from an unmanned automatic battery rental station.

In state S1, information from an ID card that has been inserted is transmitted to the central processing station, and a check of the ID card for card return is carried out at the central processing station. Result information is received back from the central processing station and the state changes to state S2 if there are no abnormalities with the ID card, while the state changes back to state S0 if abnormalities are found.

Next, in step S2, the lock of a battery to be returned is released.

Also, in step S3, the location of a fully charged electrically assisted bicycle battery is notified to the user using an audio response and the display, and flashing the LED above the storage section. In step S4, if the battery is inserted into a return storage section, the lock pins of the battery project to lock them.

In step S5, the battery bar code is read and a specific code is recognized, and information for the specific code is transmitted to the central processing station.

In step S6, the electrical usage amount of the battery is detected and an electrical usage bill is transmitted to the user through an audio response and the display, and electrical usage amount information is transmitted to the central processing station.

Next, in step S7, the location of a battery to be lent is transmitted to the user through the audio response and the display, and by flashing the LED above the storage section.

In step S8, the lock pins of the battery to be lent to the user are released.

In step S9, a message such as "operation complete" is output to the user, again through audio response and the display.

As has been described above, since the battery rental system includes an unmanned automatic battery rental station and a central processing unit for carrying out central processing of the unmanned automatic battery rental station via a communication line, battery specific processing and user specific processing can be centralized, and a fully charged battery can be used any time, any where, without the need for a charger or a spare battery.

Since the unmanned automatic battery rental station is provided with user information recognizing means, battery characteristic information recognizing means, and communication means, and carries out exchange between a user's used battery and a fully charged battery, a user can utilize a fully charged battery at any time as required.

Since the ID card stores a user and a registered ID number of an electrically assisted bicycle, the time and date of battery rental and a log of electricity rental, a user can utilize a fully charged battery with an ID card, at any time as required, and without the need for a cash disbursement.

Since bi-directional communication is carried out between an unmanned automatic battery rental station and a central processing station, via a communication line, a provider can centralize battery specific processing and user specific processing.

Accordingly, it is possible to provide a battery rental system that is extremely convenient and economical. The battery rental system is always stable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery rental system for an electrically assisted bicycle, for carrying out exchange of a battery mounted on the electrically assisted bicycle with a fully charged battery, using an ID card, comprising:
    an unmanned automatic battery rental station; and
    a central processing unit for carrying out central processing of the unmanned automatic battery rental station via a communication line.

2. A battery rental system for carrying out an exchange of a battery mounted on an electrically assisted bicycle with a fully charged battery, using an ID card comprising:
    an unmanned automatic battery rental station being provided with user information recognizing means for recognizing the user, battery characteristic information recognizing means for determining the status of the battery, and communication means for transmitting and receiving information from a central processing unit, said user information recognizing means, said battery characteristic information recognizing means and said communication means permits a user to change a user's used battery for a fully charged battery.

3. The battery rental system according to claim 2, wherein said ID card stores a user and a registered ID number of an electrically assisted bicycle, the time and date of battery rental and a log of electricity rental.

4. A method of operating a battery rental system for an electrically assisted bicycle, for carrying out an exchange of a battery mounted on the electrically assisted bicycle with a fully charged battery comprising the following steps:
    using an ID card to identify a user;
    providing an unmanned automatic battery rental station for receiving said ID card and for housing a plurality of batteries; and
    providing a central processing unit for carrying out central processing of the unmanned automatic battery rental station via a communication line to permit a user to remove a battery from said unmanned battery rental station.

5. A method of operating a battery rental system for carrying out an exchange of a battery mounted on an electrically assisted bicycle with a fully charged battery comprising the following steps:
    using an ID card to identify a user;
    providing an unmanned automatic battery rental station containing user information recognizing means, battery characteristic information recognizing means, and communication means; and
    permitting the changing of a user's used battery for a fully charged battery by use of said ID card, said user information recognizing means, battery characteristic information recognizing means and said communication means.

6. The method of operating a battery rental system according to claim 4, wherein said ID card stores a user and a registered ID number of an electrically assisted bicycle, the time and date of battery rental and a log of electricity rental.

7. A battery rental system for an electrically assisted bicycle, for carrying out an exchange of a battery mounted on the electrically assisted bicycle with a fully charged battery, using an ID card, comprising:
    an unmanned automatic battery rental station; and
    a central processing unit for carrying out central processing of the unmanned automatic battery rental station via a communication line;
    whereby bi-directional transmission of information between said unmanned automatic battery rental device and said central processor unit is carried out via said communication line.

8. A battery rental system for carrying out an exchange of a battery mounted on an electrically assisted bicycle with a fully charged battery, using an ID card comprising:
    an unmanned automatic battery rental station being provided with user information recognizing means for recognizing the user, battery characteristic information recognizing means for determining the status of the battery, and communication means for transmitting and receiving information from a central processing unit, said user information recognizing means, said battery characteristic information recognizing means and said communication means permits a user to change a user's used battery for a fully charged battery;
    whereby bi-directional transmission of information between said unmanned automatic battery rental device and said central processor unit is carried out via a communication line.

9. The battery rental system according to claim 8, wherein said ID card stores a user and a registered ID number of an electrically assisted bicycle, the time and date of battery rental and a log of electricity rental.

10. A method of operating a battery rental system for an electrically assisted bicycle, for carrying out an exchange of a battery mounted on the electrically assisted bicycle with a fully charged battery comprising the following steps:
    using an ID card to identify a user;
    providing an unmanned automatic battery rental station for receiving said ID card and for housing a plurality of batteries; and
    providing a central processing unit for carrying out central processing of the unmanned automatic battery rental station via a communication line to permit a user to remove a battery from said unmanned battery rental station;
    providing bi-directional transmission of information between said unmanned automatic battery rental device and said central processor unit is carried out via said communication line.

11. A method of operating a battery rental system for carrying out an exchange of a battery mounted on an electrically assisted bicycle with a fully charged battery comprising the following steps:

using an ID card to identify a user;

providing an unmanned automatic battery rental station containing user information recognizing means, battery characteristic information recognizing means, and communication means; and permitting the changing of a user's used battery for a fully charged battery by use of said ID card, said user information recognizing means, battery characteristic information recognizing means and said communication means;

providing bi-directional transmission of information between said unmanned automatic battery rental device and said communication means is carried out via a communication line.

12. The method of operating a battery rental system according to claim 10, wherein said ID card stores a user and a registered ID number of an electrically assisted bicycle, the time and date of battery rental and a log of electricity rental.

* * * * *